United States Patent
Miyaji (10) Patent No.: US 10,364,770 B2
(45) Date of Patent: Jul. 30, 2019

(54) FUEL PRESSURE SENSOR DIAGNOSTIC DURING ENGINE STOPPING

(71) Applicant: Toyota Jidosha Kabushiki Kaisha, Toyota-shi, Aichi-ken (JP)

(72) Inventor: Kazuya Miyaji, Okazaki (JP)

(73) Assignee: Toyota Jidosha Kabushiki Kaisha, Toyota-shi Aichi-ken (JP)

(*) Notice: Subject to any disclaimer, the term of this patent is extended or adjusted under 35 U.S.C. 154(b) by 215 days.

(21) Appl. No.: 15/080,854

(22) Filed: Mar. 25, 2016

(65) Prior Publication Data
US 2016/0281628 A1 Sep. 29, 2016

(30) Foreign Application Priority Data
Mar. 26, 2015 (JP) ................. 2015-063584

(51) Int. Cl.
*F02D 41/22* (2006.01)
*B60K 6/22* (2007.10)
(Continued)

(52) U.S. Cl.
CPC .............. *F02D 41/222* (2013.01); *B60K 6/22* (2013.01); *F02D 41/042* (2013.01); *B60K 6/442* (2013.01);
(Continued)

(58) Field of Classification Search
CPC ....... F02D 2041/223; F02D 2200/0602; F02D 41/222; F02D 41/042; B60K 6/22;
(Continued)

(56) References Cited

U.S. PATENT DOCUMENTS 8,543,272 B2 * 9/2013 Yu ................... B60W 50/0097
180/65.265
9,327,706 B2 * 5/2016 Reed ................... B60W 10/06
(Continued)

FOREIGN PATENT DOCUMENTS

JP    2001107814 A    4/2001
JP    2005-226553 A    8/2005
(Continued)

OTHER PUBLICATIONS

Office Action dated Jan. 10, 2019, issued in U.S. Appl. No. 15/481,847, 26 pages.
(Continued)

*Primary Examiner* — Hai H Huynh
*Assistant Examiner* — Gonzalo Laguarda
(74) *Attorney, Agent, or Firm* — Dinsmore & Shohl LLP (57) ABSTRACT

The vehicle is a hybrid vehicle capable of traveling using motive power of at least one of an engine and a motor generator. The vehicle includes: a fuel pump; an injection valve injecting fuel supplied from the fuel pump to the engine; a fuel pressure sensor detecting a supply pressure of the fuel generated by the fuel pump; and an engine ECU. The engine ECU performs a fuel pressure increasing process of increasing the supply pressure of the fuel generated by the fuel pump, and conducts a fault diagnosis of the fuel pressure sensor based on a value detected by the fuel pressure sensor during the fuel pressure increasing process. The engine ECU conducts the fault diagnosis of the fuel pressure sensor in a case where the engine is being stopped and a vehicle speed is higher than a threshold value.

6 Claims, 6 Drawing Sheets

(51) Int. Cl.
*F02D 41/04* (2006.01)
*B60K 6/442* (2007.10)
*F02M 63/02* (2006.01)
*F02M 69/04* (2006.01)

(52) U.S. Cl.
CPC ..... *B60Y 2200/92* (2013.01); *B60Y 2300/432* (2013.01); *B60Y 2306/15* (2013.01); *F02D 2041/223* (2013.01); *F02D 2200/0602* (2013.01); *F02M 63/0285* (2013.01); *F02M 69/046* (2013.01); *Y02T 90/34* (2013.01); *Y10S 903/904* (2013.01)

(58) Field of Classification Search
CPC ................ B60K 6/442; B60Y 2200/92; B60Y 2300/432; B60Y 2306/15; F02M 63/0285; F02M 69/046; Y10S 903/904
USPC .... 123/387, 198 D, 479, 497, 510; 701/107, 701/112; 73/114.38, 114.41, 114.42, 73/114.43
See application file for complete search history.

(56) References Cited

U.S. PATENT DOCUMENTS

| | | | |
|---|---|---|---|
| 9,664,166 B2* | 5/2017 | Nagakura | ............... F02M 59/20 |
| 2009/0240417 A1 | 9/2009 | Fushiki et al. | |
| 2011/0118078 A1* | 5/2011 | Kraska | ..................... B60K 6/48 |
| | | | 477/5 |
| 2011/0196594 A1 | 8/2011 | Hasegawa | |
| 2012/0090391 A1 | 4/2012 | Ando | |
| 2015/0159574 A1 | 6/2015 | Stack et al. | |
| 2016/0040617 A1* | 2/2016 | Nagakura | ............... F02M 59/20 |
| | | | 701/104 |
| 2016/0076475 A1* | 3/2016 | Suzuki | ............... F02M 63/0225 |
| | | | 123/445 |
| 2016/0230693 A1* | 8/2016 | Miyaji | .................... F02D 41/34 |
| 2017/0292468 A1* | 10/2017 | Lee | ..................... F02D 41/3005 |
| 2017/0298889 A1* | 10/2017 | Okubo | .................. F02M 69/54 |

FOREIGN PATENT DOCUMENTS

| | | |
|---|---|---|
| JP | 2006254628 A | 9/2006 |
| JP | 2009-197807 A | 9/2009 |
| JP | 2010-168901 A | 8/2010 |
| JP | 2010-208576 A | 9/2010 |
| JP | 2011185158 A | 9/2011 |
| JP | 2013-068127 A | 4/2013 |
| JP | 2013-107539 A | 6/2013 |
| JP | 2013238202 A | 11/2013 |
| JP | 2014-121976 A | 7/2014 |
| JP | 2016056794 A | 4/2016 |
| WO | 2011007772 A1 | 1/2011 |

OTHER PUBLICATIONS

Corrected Notice of Allowance issued in U.S. Appl. No. 15/481,847 dated May 8, 2019.
Notice of Allowance issued in U.S. Appl. No. 15/481,847 dated Apr. 1, 2019.

* cited by examiner

FUEL PRESSURE SENSOR DIAGNOSTIC DURING ENGINE STOPPING

CROSS-REFERENCE TO RELATED APPLICATIONS

This nonprovisional application is based on Japanese Patent Application No. 2015-063584 filed on Mar. 26, 2015 with the Japan Patent Office, the entire contents of which are hereby incorporated by reference.

BACKGROUND

Technical Field

The present specification relates to a hybrid vehicle including a fuel pressure sensor detecting a supply pressure of fuel generated by a fuel pump.

Description of the Background Art

Japanese Patent Laying-Open No. 2013-68127 discloses that a fault diagnosis of a fuel pressure sensor is conducted for a vehicle which includes a fuel pump, an injection valve injecting fuel supplied from the fuel pump to an engine, and the fuel pressure sensor detecting a supply pressure of the fuel generated by the fuel pump. For the fault diagnosis of the fuel pressure sensor, the fuel pressure is increased to a diagnosis fuel pressure higher than a fuel pressure for normal use. Based on whether or not an output of the fuel pressure sensor is changed to a value representing the diagnosis fuel pressure by the increase of the fuel pressure to the diagnosis fuel pressure, it is determined whether or not the fuel pressure sensor has a fault.

SUMMARY

During the aforementioned fault diagnosis of the fuel pressure sensor, the fuel pressure is higher than the fuel pressure for normal use. Therefore, if the fault diagnosis of the fuel pressure sensor is conducted while the engine is operating, the fuel injection quantity could become larger than required to deteriorate combustion of the engine. In view of this, in the case where the fault diagnosis of the fuel pressure sensor is applied to a hybrid vehicle equipped with an engine and a motor, the fault diagnosis of the fuel pressure sensor may be conducted during a motor travel mode in which the engine is stopped and the vehicle is traveling using motive power of the motor, in order to avoid influence on combustion of the engine.

However, during the fault diagnosis of the fuel pressure sensor, the work amount (rotational speed) of the fuel pump is required to increase in order to increase the fuel pressure, and accordingly the operating sound of the fuel pump increases. Therefore, if the fault diagnosis of the fuel pressure sensor is conducted during the motor travel mode of the vehicle, the operating sound of the fuel pump increases while no engine sound is generated. Thus, the operating sound of the fuel pump could be more audible to the user to thereby deteriorate the drivability.

The disclosure of the present specification has been made to solve the above-described problem, and an object of the present specification is to conduct a fault diagnosis of a fuel pressure sensor of a hybrid vehicle equipped with the fuel pressure sensor detecting the supply pressure of fuel generated by a fuel pump, without deteriorating the drivability.

A vehicle according to the present specification is a vehicle capable of traveling using motive power of at least one of an engine and a motor generator, and includes: a fuel pump; an injection valve configured to inject fuel supplied from the fuel pump to the engine; a fuel pressure sensor configured to detect a supply pressure of the fuel generated by the fuel pump; and an electronic control unit configured to perform a fuel pressure increasing process of increasing the supply pressure of the fuel generated by the fuel pump to a second fuel pressure higher than a first fuel pressure, and conduct a fault diagnosis of the fuel pressure sensor based on a value detected by the fuel pressure sensor during the fuel pressure increasing process. The electronic control unit is configured to conduct the fault diagnosis of the fuel pressure sensor in a case where the engine is being stopped and a vehicle speed is higher than a threshold value.

According to this configuration, the engine is stopped during the fault diagnosis of the fuel pressure sensor. Therefore, even when the fuel pressure increasing process is performed for the fault diagnosis of the fuel pressure sensor, influence on combustion of the engine can be avoided. Further, the vehicle speed is higher than a threshold value during the fault diagnosis of the fuel pressure sensor. Therefore, even when the operating sound of the fuel pump is increased by the fuel pressure increasing process while engine is being stopped and thus no engine sound is generated, the traveling noise of the vehicle is large because of the vehicle speed higher than the threshold value and thus the operating sound of the fuel pump is relatively less audible to the user. Accordingly, the fault diagnosis of the fuel pressure sensor can be conducted without deteriorating the drivability.

In some embodiments, the electronic control unit is configured to conduct the fault diagnosis of the fuel pressure sensor in a case where: the engine is being stopped; the vehicle speed is higher than the threshold value; and it is determined that the engine can be kept stopped longer than a time taken for the fault diagnosis of the fuel pressure sensor.

According to this configuration, the fault diagnosis of the fuel pressure sensor is conducted in the case where it is determined that the engine can be kept stopped longer than the time taken for the fault diagnosis of the fuel pressure sensor. Accordingly, start of the engine during the fault diagnosis of the fuel pressure sensor can be avoided, and thus deterioration of combustion when the engine is started can be suppressed.

In some embodiments, the vehicle further includes a power storage device storing electric power to be supplied to the motor generator. The electronic control unit determines that the engine can be kept stopped longer than the time taken for the fault diagnosis of the fuel pressure sensor in a case where a state of charge of the power storage device is higher than a predetermined amount.

In some embodiments, the vehicle further includes an apparatus configured to retrieve travel route information. The electronic control unit determines that the engine can be kept stopped longer than the time taken for the fault diagnosis of the fuel pressure sensor in a case where the state of charge of the power storage device is higher than the predetermined amount and the travel route information is not information indicating an uphill road.

According to these configurations, it can appropriately be determined whether or not the engine can be kept stopped longer than the time taken for the fault diagnosis of the fuel pressure sensor, based on the state of charge of the power storage device and the travel route information.

In some embodiments, the first fuel pressure is a control fuel pressure used when the fault diagnosis of the fuel pressure sensor is not conducted. The second fuel pressure is a diagnosis fuel pressure used when the fault diagnosis of the fuel pressure sensor is conducted.

According to this configuration, even when the fuel pressure is increased to the diagnosis fuel pressure which is not used under normal control, deterioration of the drivability can be suppressed.

In some embodiments, the injection valve is a port injection valve injecting fuel to an intake passage of the engine.

According to this configuration, a fault diagnosis of the fuel pressure sensor detecting the fuel pressure of the port injection valve can be conducted without deteriorating the drivability.

The foregoing and other objects, features, aspects and advantages of the present specification will become more apparent from the following detailed description of the present specification when taken in conjunction with the accompanying drawings.

DESCRIPTION OF THE PREFERRED EMBODIMENTS

Embodiments of the present specification will hereinafter be described in detail with reference to the drawings. In the drawings, the same or corresponding parts are denoted by the same reference characters, and a description thereof will not be repeated.

[Basic Configuration of Vehicle]

Figure 1:
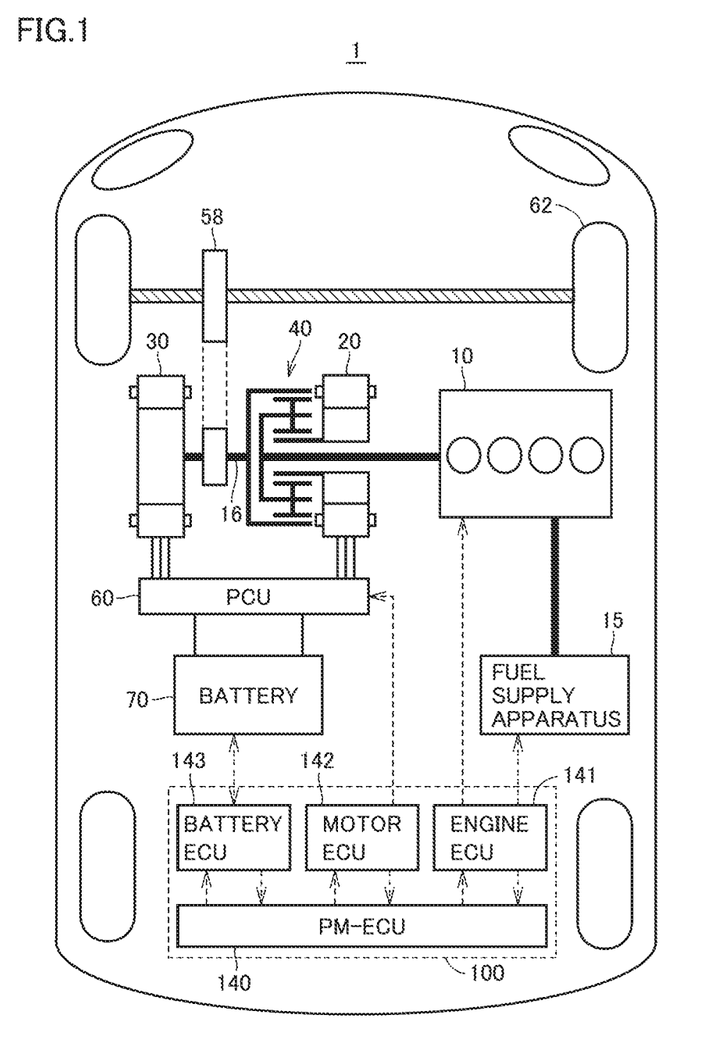
FIG. 1 is a block diagram showing a configuration of a vehicle.

FIG. 1 is a block diagram showing a configuration of a vehicle 1 to which the disclosure of the present specification is applied. Referring to FIG. 1, vehicle 1 includes an engine 10, a fuel supply apparatus 15, motor generators 20, 30, a power split device 40, a reduction mechanism 58, drive wheels 62, a power control unit (PCU) 60, a battery 70, and a electronic control unit 100.

This vehicle 1 is a series-parallel-type hybrid vehicle and configured to be capable of traveling with at least one of engine 10 and motor generator 30 acting as a driving source. More specifically, vehicle 1 is capable of traveling using both the motive power of engine 10 and the motive power of motor generator 30, and also capable of traveling using the motive power of motor generator 30 with engine 10 stopped. In the following, a mode in which the vehicle travels using both the motive power of engine 10 and the motive power of motor generator 30 is referred to as "hybrid travel (HV travel) mode" and a mode in which the vehicle travels using the motive power of motor generator 30 with engine 10 stopped is referred to as "motor travel (EV travel) mode."

Engine 10, motor generator 20, and motor generator 30 are coupled to each other via power split device 40. To a rotational shaft 16 of motor generator 30 which is coupled to power split device 40, reduction mechanism 58 is connected. Rotational shaft 16 is coupled via reduction mechanism 58 to drive wheels 62 and also coupled via power split device 40 to a crankshaft of engine 10.

Power split device 40 is a planetary gear train including a sun gear, a pinion gear, a carrier, and a ring gear. The pinion gear meshes with the sun gear and the ring gear. The carrier supports the pinion gear so that the pinion gear can rotate about its axis, and is coupled to engine 10. The sun gear is coupled to motor generator 20. The ring gear is coupled via rotational shaft 16 to motor generator 30 and drive wheels 62.

Power split device 40 has a characteristic that the rotational speed of the sun gear, the rotational speed of the carrier, and the rotational speed of the ring gear have a relation therebetween represented by a straight line connecting these rotational speeds together in a monographic chart (a relation that in the case where two of respective values of the rotational speeds are determined, the remaining value is accordingly determined). Therefore, an appropriate adjustment of the rotational speed of motor generator 20 which is coupled to the sun gear allows power split device 40 to function as an electrical continuously-variable transmission capable of continuously varying the ratio between the rotational speed (namely vehicle speed) of drive wheels 62 coupled to the ring gear and the rotational speed of engine 10 coupled to the carrier.

While the present embodiment will be described regarding the case where the present disclosure is applied to a hybrid vehicle including power split device 40 (electrical continuously-variable transmission), the vehicle to which the present disclosure is applicable is not limited to the hybrid vehicle including power split device 40 but applicable to any hybrid vehicle which is capable of traveling in the motor travel mode.

Motor generators 20 and 30 are both a well-known synchronous generator motor which can operate as either a generator or a motor. Motor generators 20 and 30 are connected to PCU 60, and PCU 60 is connected to battery 70.

The electronic control unit 100 includes a power management electronic control unit (hereinafter PM-ECU) 140, an engine electronic control unit (hereinafter engine ECU) 141, a motor electronic control unit (hereinafter motor ECU) 142, and a battery electronic control unit (hereinafter battery ECU) 143.

PM-ECU 140 is connected via a communication port (not shown) to engine ECU 141, motor ECU 142, and battery ECU 143. PM-ECU 140 communicates a variety of control signals and data with engine ECU 141, motor ECU 142, and battery ECU 143.

Motor ECU 142 is connected to PCU 60 and controls driving of motor generators 20 and 30. Battery ECU 143 calculates the remaining capacity (hereinafter referred to as "battery SOC" (State Of Charge)) of battery 70, based on the integral value of the charging/discharging current of battery 70.

Engine ECU 141 is connected to engine 10 and fuel supply apparatus 15. Engine ECU 141 receives signals from a variety of sensors detecting the operating condition of engine 10 (such as accelerator pedal position sensor, throttle opening position sensor, engine rotational speed sensor, engine water temperature sensor 12, and air-fuel ratio sensor), and performs operational control such as fuel injection control, ignition control, and intake air quantity control, in accordance with the received signals.

For example, engine ECU 141 controls the throttle opening position (intake air quantity) based on the vehicle speed and the accelerator pedal position, for example. Engine ECU 141 also performs feedback control for the fuel injection quantity so that the air-fuel ratio detected by an air-fuel ratio sensor (not shown) provided on an exhaust passage becomes a target air-fuel ratio (stoichiometric air-fuel ratio, for example). For example, in the case where the intake air quantity increases to cause the air-fuel ratio to have a value of a lean air-fuel ratio, with respect to the target air-fuel ratio, engine ECU 141 increases the fuel injection quantity so that the air-fuel ratio becomes closer to the target air-fuel ratio.

[Configuration Involved in Fuel Supply]

Figure 2:
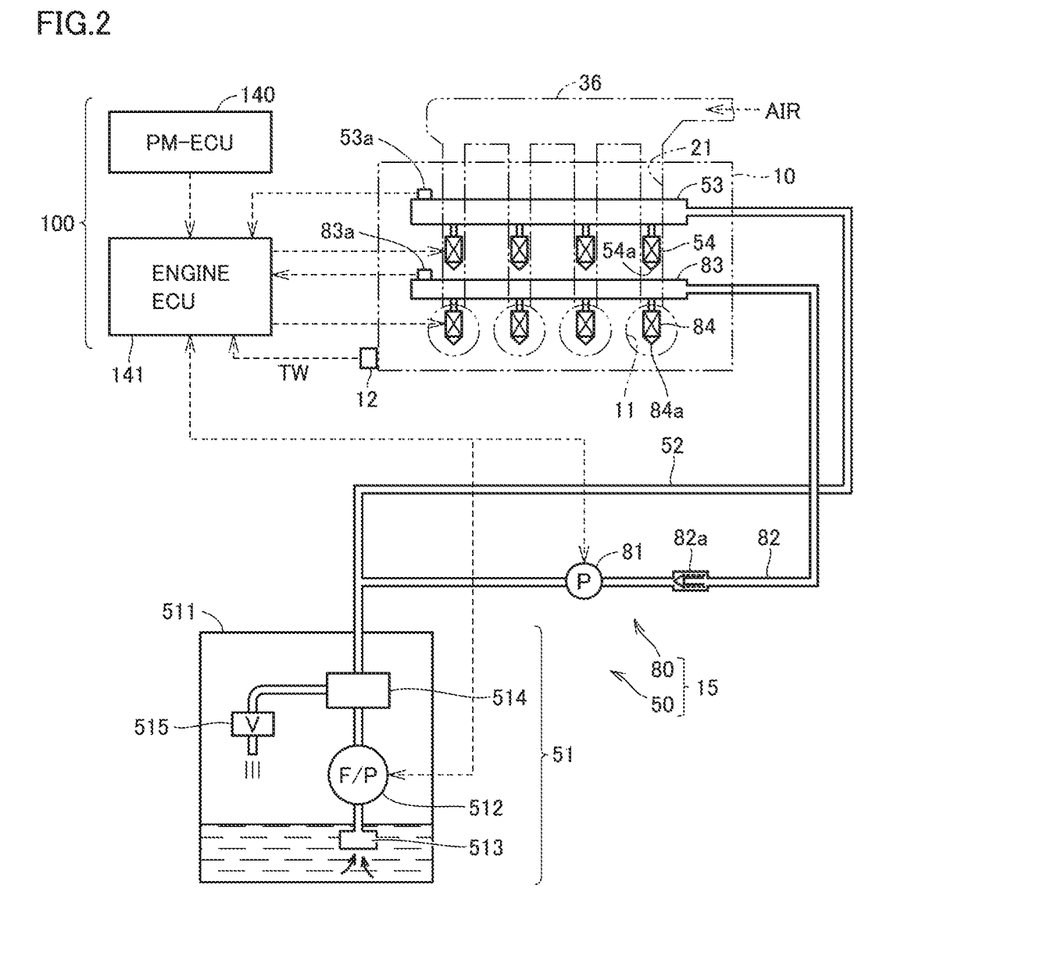
FIG. 2 is a diagram showing a configuration of an engine and a fuel supply apparatus.

FIG. 2 is a diagram showing a configuration of engine 10 and fuel supply apparatus 15 involved in fuel supply. In the present embodiment, a vehicle to which the present specification is applied is a hybrid vehicle in which a dual-injection-type internal combustion engine using in-cylinder injection and port injection in combination, such as for example a four-series-cylinder gasoline engine, is adopted as an internal combustion engine.

Referring to FIG. 2, engine 10 includes an intake manifold 36, a throttle valve (not shown), an intake port 21, and four cylinders 11 provided in a cylinder block.

In an intake stroke of each cylinder 11, intake air AIR is drawn from an intake pipe into each cylinder 11 through intake manifold 36 and intake port 21.

The quantity of air drawn into each cylinder 11 (intake air quantity) is adjusted based on the opening position (throttle opening position θ) of throttle valve (not shown). Throttle opening position θ is controlled based on a control signal from engine ECU 141.

Fuel supply apparatus 15 includes a low-pressure fuel supply mechanism 50 and a high-pressure fuel supply mechanism 80. Low-pressure fuel supply mechanism 50 includes a fuel delivery unit 51, a low-pressure fuel pipe 52, a low-pressure delivery pipe 53, a low-pressure fuel pressure sensor 53a, and a port injection valve 54.

High-pressure fuel supply mechanism 80 includes a high-pressure pump 81, a check valve 82a, a high-pressure fuel pipe 82, a high-pressure delivery pipe 83, a high-pressure fuel pressure sensor 83a, and an in-cylinder injection valve 84.

In-cylinder injection valve 84 is an injector for in-cylinder injection having an injection hole portion 84a exposed in a combustion chamber of each cylinder 11. When in-cylinder injection valve 84 is opened, compressed fuel in high-pressure delivery pipe 83 is injected into the combustion chamber 16 from injection hole portion 84a of in-cylinder injection valve 84.

Engine ECU 141 is configured to include a CPU (Central Processing Unit), a ROM (Read Only Memory), a RAM (Random Access Memory), an input interface circuit, and an output interface circuit, for example. Engine ECU 141 receives an engine start/stop command from the PM-ECU 140 in FIG. 1, and accordingly controls engine 10 and fuel supply apparatus 15.

Engine ECU 141 calculates a necessary fuel injection quantity for each combustion, based on the accelerator pedal position, the intake air quantity (throttle opening position θ), the engine rotational speed, and the air-fuel ratio, for example. Based on the calculated fuel injection quantity, engine ECU 141 outputs, at an appropriate time, an injection command signal for example to port injection valve 54 and in-cylinder injection valve 84.

While the present embodiment is described regarding the case where low-pressure fuel supply mechanism 50 and high-pressure fuel supply mechanism 80 are provided, the present invention is also applicable to a configuration where high-pressure fuel supply mechanism 80 is not provided but low-pressure fuel supply mechanism 50 is provided.

In the following, low-pressure fuel supply mechanism 50 will be described in more detail. Fuel delivery unit 51 includes a fuel tank 511, a feed pump 512, a suction filter 513, a fuel filter 514, and a relief valve 515.

Fuel tank 511 stores fuel, such as gasoline for example, to be consumed by engine 10. Suction filter 513 prevents foreign matter from being sucked in. Fuel filter 514 removes foreign matter in discharged fuel.

Relief valve 515 is opened when the pressure of fuel discharged from feed pump 512 reaches an upper limit pressure, and is kept closed while the fuel pressure is less than the upper limit pressure.

Low-pressure fuel pipe 52 connects fuel delivery unit 51 to low-pressure delivery pipe 53. It should be noted that low-pressure fuel pipe 52 is not limited to the fuel pipe, and may be one member through which a fuel passage is formed, or a plurality of members between which a fuel passage is formed.

Low-pressure delivery pipe 53 is connected, at one end along the direction in which cylinders 11 are arranged in series, to low-pressure fuel pipe 52. To low-pressure delivery pipe 53, port injection valve 54 is coupled. To low-pressure delivery pipe 53, low-pressure fuel pressure sensor 53a detecting the inside fuel pressure is attached.

Port injection valve 54 is an injector for port injection having an injection hole portion 54a exposed in intake port 21 which is associated with each cylinder 11. Port injection valve 54 is a needle valve which is opened upon being energized through a control signal from engine ECU 141. When port injection valve 54 is opened, the fuel compressed by feed pump 512 and present in low-pressure delivery pipe 53 is injected from injection hole portion 54a into intake port 21.

Based on a command signal transmitted from engine ECU 141, feed pump 512 is driven and stopped.

Feed pump 512 can draw fuel from inside fuel tank 511, compress the drawn fuel, and then discharge the fuel. Further, under control by engine ECU 141, feed pump 512 can change the discharge quantity per unit time [$m^3$/sec] and the discharge pressure [kPa: kilopascal].

[Fault Diagnosis of Low-Pressure Fuel Pressure Sensor 53a]

In order to variably control the supply pressure of fuel (hereinafter also referred to as "fuel pressure P") generated by feed pump 512, it is necessary to ensure the reliability of the value detected by low-pressure fuel pressure sensor 53a mounted on low-pressure delivery pipe 53 storing fuel for port injection.

For this sake, engine ECU 141 in the present embodiment regularly conducts a fault diagnosis of low-pressure fuel pressure sensor 53a. For the fault diagnosis of low-pressure fuel pressure sensor 53a, engine ECU 141 increases fuel pressure P to diagnosis pressure P2 corresponding to the valve-opening pressure of relief valve 515. Based on whether or not the output of low-pressure fuel pressure sensor 53a is changed to a value representing the valve-opening pressure (diagnosis pressure P2) of relief valve 515 by the increase of fuel pressure P to diagnosis pressure P2, engine ECU 141 determines whether or not low-pressure fuel pressure sensor 53a has a fault.

Figure 3:
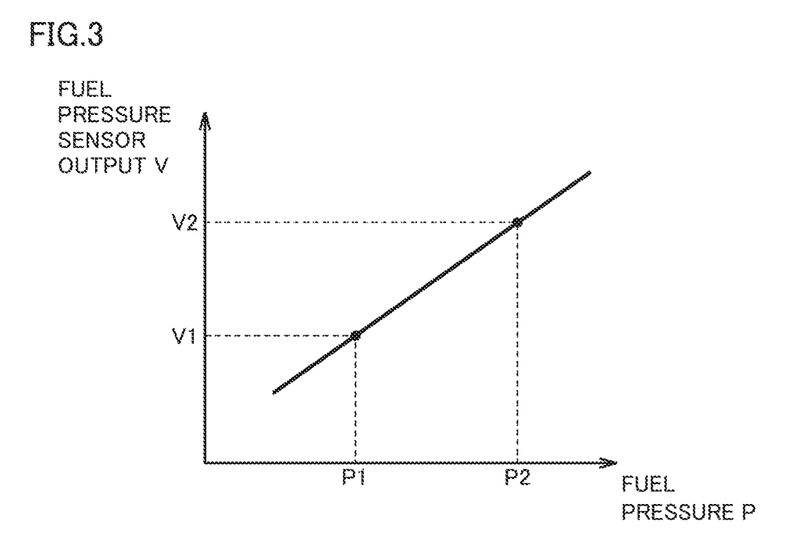
FIG. 3 is a diagram showing a correlation between fuel pressure P and output voltage V of a low-pressure fuel pressure sensor.

FIG. 3 is a diagram showing a correlation between fuel pressure P [unit: kPa] and output voltage V [unit: V (volt)] of low-pressure fuel pressure sensor 53a in the case where low-pressure fuel pressure sensor 53a is in a normal condition. As shown in FIG. 3, in the case where low-pressure fuel pressure sensor 53a is in a normal condition, the higher the fuel pressure P, the higher the output voltage V of low-pressure fuel pressure sensor 53a.

During normal control (in the case where a fault diagnosis of low-pressure fuel pressure sensor 53a is not conducted), engine ECU 141 controls feed pump 512 so that fuel pressure P is normal control pressure P1 (400 kPa for example). At this time, if low-pressure fuel pressure sensor 53a is in a normal condition, output voltage V of low-pressure fuel pressure sensor 53a is a value representing voltage V1 corresponding to normal control pressure P1.

In contrast, in the case where a fault diagnosis of low-pressure fuel pressure sensor 53a is to be conducted, engine ECU 141 performs control for increasing fuel pressure P to diagnosis pressure P2 (650 kPa for example) which is higher than normal control pressure P1, by increasing the output of feed pump 512 (this control is hereinafter also referred to as "fuel pressure increasing process"). Specifically, engine ECU 141 performs feed-forward control on feed pump 512 so that fuel pressure P becomes diagnosis pressure P2. As described above, diagnosis pressure P2 is a fuel pressure corresponding to the valve opening pressure of relief valve 515.

If low-pressure fuel pressure sensor 53a is in a normal condition during the fuel pressure increasing process, output voltage V of low-pressure fuel pressure sensor 53a is a value representing voltage V2 corresponding to diagnosis pressure P2. Thus, based on whether or not the value detected by low-pressure fuel pressure sensor 53a is changed from voltage V1 corresponding to normal control pressure P1 to voltage V2 corresponding to diagnosis pressure P2 by the performed fuel pressure increasing process, engine ECU 141 determines whether or not low-pressure fuel pressure sensor 53a has a fault.

[Conditions for Conducting Fault Diagnosis of Low-Pressure Fuel Pressure Sensor 53a]

As described above, fuel pressure P is increased during the fault diagnosis of low-pressure fuel pressure sensor 53a. Therefore, if the fault diagnosis of fuel pressure sensor 53a is conducted while the engine is operating, the fuel injection quantity could become larger than required to thereby deteriorate combustion of engine 10. In order to avoid influence on combustion of engine 10, the fault diagnosis of low-pressure fuel pressure sensor 53a may be conducted while engine 10 is stopped (typically during the motor travel mode).

However, during the fault diagnosis of low-pressure fuel pressure sensor 53a, it is necessary to keep the work amount (rotational speed) of feed pump 512 larger than the work amount during normal control in order to keep fuel pressure P at diagnosis pressure P2. Due to this, the operating sound of feed pump 512 (hereinafter referred to as "pump sound") is also larger. Therefore, if the fault diagnosis of low-pressure fuel pressure sensor 53a is conducted while engine 10 is stopped, the pump sound is increased while no operating sound of engine 10 (hereinafter referred to as "engine sound") is heard. Accordingly, the pump sound is made relatively more audible to the user, which could deteriorate the drivability. Further, opening/closing sound (chattering) of relief valve 515 caused by the increase of fuel pressure P to diagnosis pressure P2 could also be made more audible to the user.

In view of the problem as described above, engine ECU 141 of the present embodiment conducts the fault diagnosis of low-pressure fuel pressure sensor 53a in the case where engine 10 is being stopped and the vehicle speed is higher than threshold value V1. Thus, engine 10 is stopped during the fault diagnosis of low-pressure fuel pressure sensor 53a and therefore influence on combustion of engine 10 can be avoided even when fuel pressure P is increased to diagnosis pressure P2 by the fuel pressure increasing process. Further, since the vehicle speed is higher than threshold value V1 and the traveling noise of the vehicle is large during the fault diagnosis of low-pressure fuel pressure sensor 53a, the pump sound and the opening/closing sound of the relief valve 515 are relatively less audible to the user even when the pump sound becomes larger or the opening/closing sound of relief valve 515 is generated while no engine sound is heard. Accordingly, the fault diagnosis of low-pressure fuel pressure sensor 53a can be conducted without deteriorating the drivability.

Figure 4:
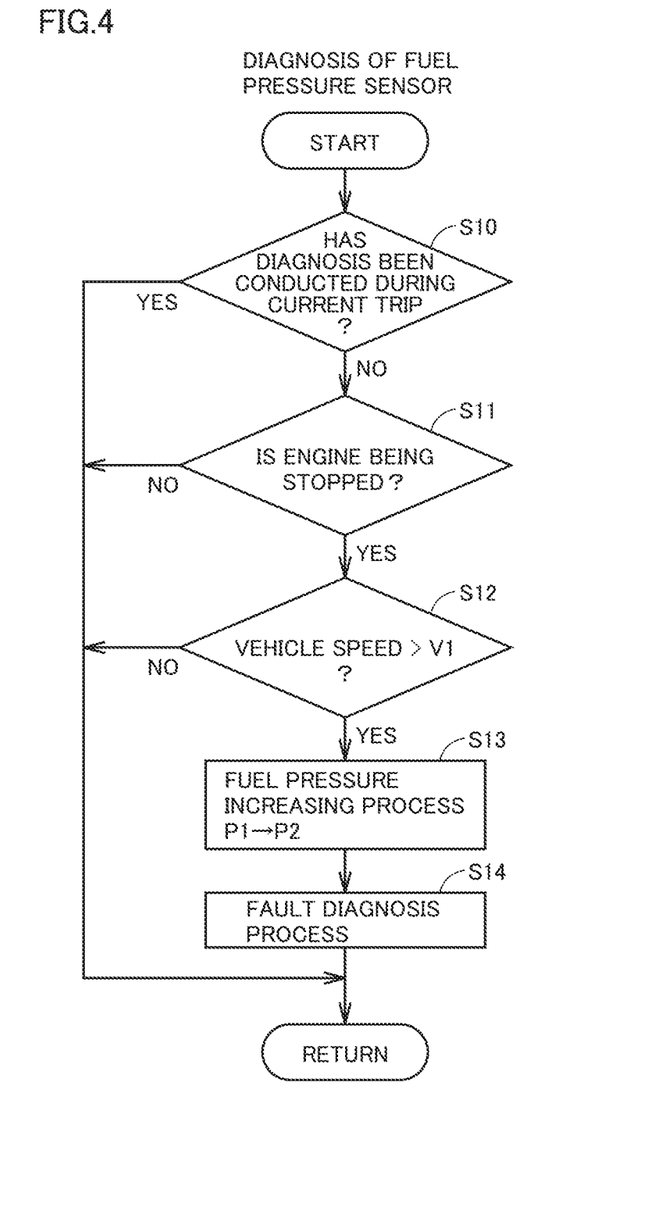
FIG. 4 is a flowchart (1) showing a process procedure of an engine ECU.

FIG. 4 is a flowchart showing a process procedure in the case where engine ECU 141 conducts a fault diagnosis of low-pressure fuel pressure sensor 53a. This flowchart is repeatedly followed at predetermined intervals while engine ECU 141 is operating.

In step (step is hereinafter abbreviated as "S") 10, engine ECU 141 determines whether or not a fault diagnosis of low-pressure fuel pressure sensor 53a has already been conducted during the current trip. It should be noted that "trip" is a measure representing a single travel, and is typically a period from the time a user starts a vehicle system to the time the user thereafter stops the vehicle system.

In the case where a fault diagnosis of low-pressure fuel pressure sensor 53a has already been conducted during the current trip (YES in S10), engine ECU 141 directly ends the process without performing the subsequent operations in S11 to S14. In this way, the fault diagnosis of low-pressure fuel pressure sensor 53a is prevented from being conducted multiple times during one trip. Namely, the frequency at which the fault diagnosis of low-pressure fuel pressure sensor 53a is conducted is once per trip.

In the case where a fault diagnosis of low-pressure fuel pressure sensor 53a has not yet been conducted during the current trip (NO in S10), engine ECU 141 determines in S11 whether or not engine 10 is being stopped. In the case where engine 10 is operating (NO in S11), engine ECU 141 directly ends the process without performing the subsequent operations in S12 to S14.

In the case where engine 10 is being stopped (YES in S11), engine ECU141 determines in S12 whether or not the vehicle speed is higher than threshold value V1. Threshold value V1 is a vehicle speed at which traveling noise of the vehicle is generated to the extent that makes the pump sound and the opening/closing sound of the relief valve 515 relatively less audible to the user even when fuel pressure P is increased to diagnosis pressure P2 while engine 10 is being stopped. Threshold value V1 is determined in advance through an experiment or the like and stored in a memory or the like of engine ECU 141. In the case where the vehicle speed is not higher than threshold value V1 (NO in S12), engine ECU141 directly ends the process without performing the subsequent operations in S13, S14.

In the case where the vehicle speed is higher than threshold value V1 (YES in S12), engine ECU 141 performs in S13 the above-described fuel pressure increasing process.

Specifically, engine ECU 141 performs feed-forward control on feed pump 512 so that fuel pressure P is increased from normal control pressure P1 to diagnosis pressure P2.

In S14, engine ECU 141 performs a fault diagnosis process for low-pressure fuel pressure sensor 53a. In this fault diagnosis process, engine ECU 141 determines that, in the case where the output of low-pressure fuel pressure sensor 53a is a value representing voltage V2 which corresponds to diagnosis pressure P2, low-pressure fuel pressure sensor 53a is in a normal condition. Otherwise, engine ECU 141 determines that low-pressure fuel pressure sensor 53a has a fault.

As seen from the foregoing, in the case where engine 10 is being stopped and the vehicle speed is higher than threshold value V1 (in the case where the traveling noise of the vehicle is large), engine ECU 141 of the present embodiment conducts the fault diagnosis of low-pressure fuel pressure sensor 53a. Thus, even when the pump sound increases while no engine sound is heard, the pump sound is relatively less audible to the user since the traveling noise is large. Accordingly, the fault diagnosis of low-pressure fuel pressure sensor 53a can be conducted without deteriorating the drivability.

<Modification 1>

Regarding the foregoing embodiment, the description has been given of the case where the fault diagnosis of low-pressure fuel pressure sensor 53a is conducted when engine 10 is being stopped and the vehicle speed is higher than threshold value V1.

However, in the case where it becomes necessary to start engine 10 during the fault diagnosis of low-pressure fuel pressure sensor 53a, engine 10 is started while fuel pressure P has been increased by the fuel pressure increasing process to diagnosis pressure P2 higher than normal control pressure P1. Therefore, the combustion state when the engine is started could be deteriorated.

Figure 5:
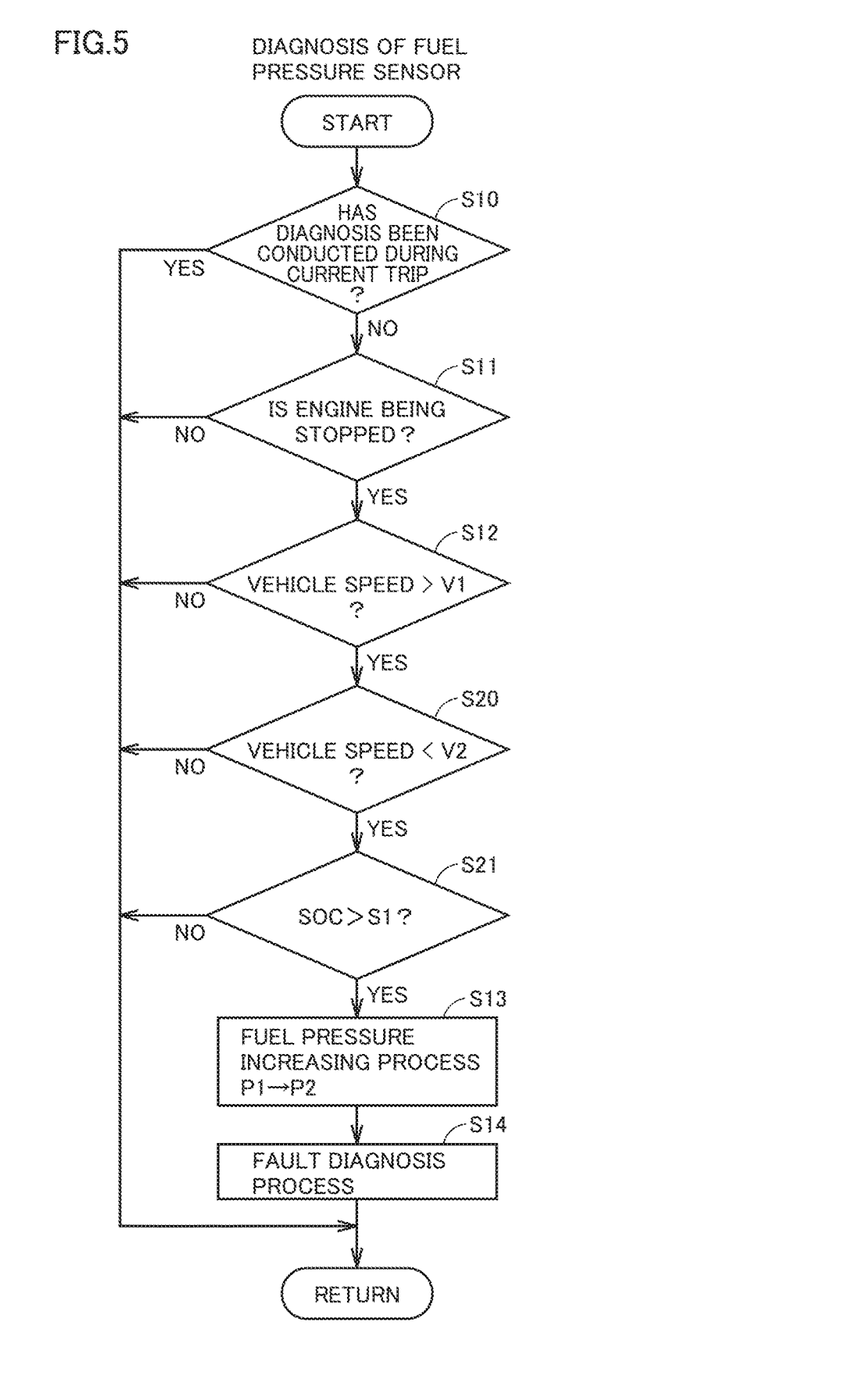
FIG. 5 is a flowchart (2) showing a process procedure of the engine ECU.

In view of this, engine ECU141 of the present modification determines (predicts), in the case where engine 10 is being stopped and the vehicle speed is higher than threshold value V1, whether or not engine 10 can be kept stopped longer than the time taken for the fault diagnosis of low-pressure fuel pressure sensor 53a, based on the vehicle speed and the battery SOC. Then, when engine ECU141 determines that engine 10 can be kept stopped longer than the time taken for the fault diagnosis of low-pressure fuel pressure sensor 53a, engine ECU 141 conducts the fault diagnosis of low-pressure fuel pressure sensor 53a.

FIG. 5 is a flowchart showing a process procedure in the case where engine ECU141 of the present modification conducts a fault diagnosis of low-pressure fuel pressure sensor 53a. It should be noted that the description of steps that are a part of the steps shown in FIG. 5 and are each denoted by the same numeral as the corresponding step in FIG. 4 described above will not be repeated, since the description has already been given above.

In the case where engine 10 is being stopped (YES in S11) and the vehicle speed is higher than threshold value V1 (YES in S12), engine ECU141 makes a determination in S20 as to whether or not the vehicle speed is less than threshold value V2 (V2>V1). This determination is made for confirming that the vehicle speed is a vehicle speed at which engine 10 can be kept stopped until the fault diagnosis of low-pressure fuel pressure sensor 53a is completed.

In the case where the vehicle speed is higher than threshold value V2 (NO in S20), it is assumed that the required drive force is large. Therefore, even if the fault diagnosis of low-pressure fuel pressure sensor 53a is started, it is highly possible that the need to start engine 10 arises before the fault diagnosis is completed. Thus, engine ECU141 ends the process without conducting the fault diagnosis of low-pressure fuel pressure sensor 53a.

In the case where the vehicle speed is less than threshold value V2 (YES in S20), engine ECU141 makes a determination in S21 as to whether or not the battery SOC is higher than threshold value S1. This determination is made for confirming that electric power which can be supplied to motor generator 30 before the fault diagnosis of low-pressure fuel pressure sensor 53a is completed is sufficiently stored in battery 70.

In the case where the battery SOC is less than threshold value S1 (NO in S21), sufficient electric power is not stored in battery 70. Therefore, even if the fault diagnosis of low-pressure fuel pressure sensor 53a is started, it is highly possible that the need to start engine 10 arises before the fault diagnosis is completed. Thus, engine ECU141 ends the process without conducting the fault diagnosis.

In the case where the battery SOC is higher than threshold value S1 (YES in S21), engine ECU141 determines that engine 10 can be kept stopped longer than the time taken for the fault diagnosis of low-pressure fuel pressure sensor 53a, and conducts the fault diagnosis of low-pressure fuel pressure sensor 53a (S13, S14).

As seen from the foregoing, in the case where: engine 10 is being stopped; the vehicle speed is higher than threshold value V1; and it is determined based on the vehicle speed and the battery SOC that engine 10 can be kept stopped, engine ECU141 conducts the fault diagnosis of low-pressure fuel pressure sensor 53a. In this way, start of engine 10 while fuel pressure P is increased to diagnosis pressure P2 by the fuel pressure increasing process can be avoided.

<Modification 2>

In Modification 1 as described above, it is determined, based on the vehicle speed and the battery SOC, whether or not engine 10 can be kept stopped longer than the time taken for the fault diagnosis of low-pressure fuel pressure sensor 53a. However, depending on the travel route of vehicle 1 when, for example, vehicle travels on an uphill road, the required drive force is larger and thus the need to start engine 10 could arise.

In view of the above, in the case where vehicle 1 is equipped with a navigation apparatus capable of retrieving information about the travel route, it may be determined, based on the travel route information in addition to the vehicle speed and the battery SOC, whether or not engine 10 can be kept stopped longer than the time taken for the fault diagnosis of low-pressure fuel pressure sensor 53a.

Figure 6:
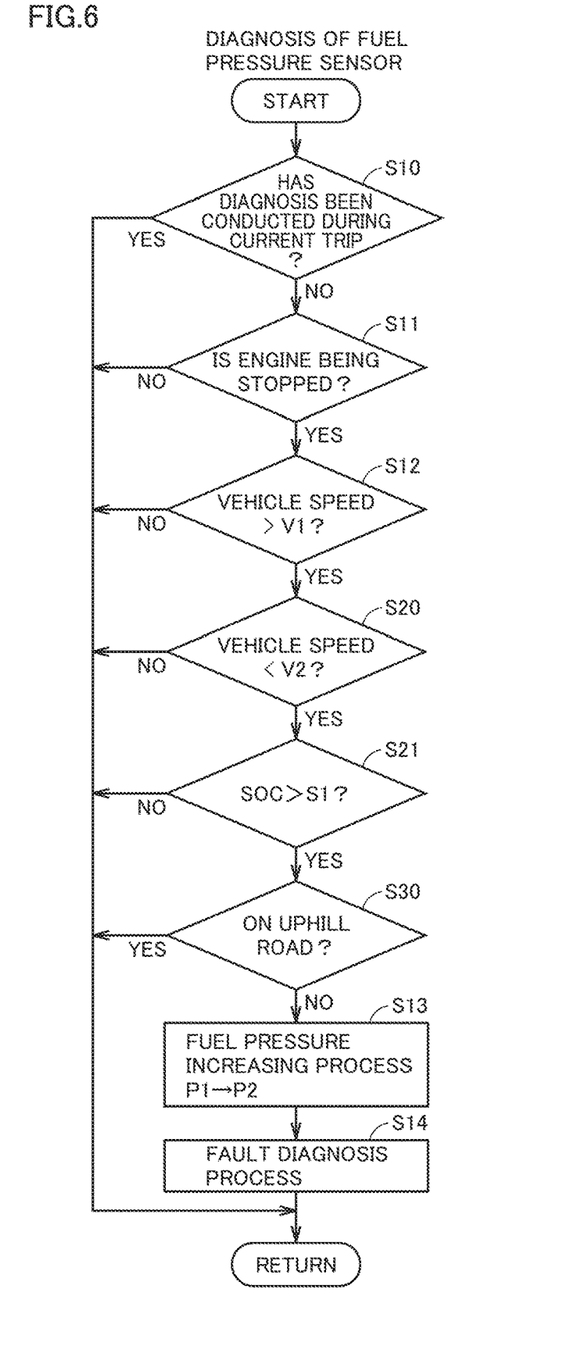
FIG. 6 is a flowchart (3) showing a process procedure of the engine ECU.

FIG. 6 is a flowchart showing a process procedure in the case where engine ECU141 of the present modification conducts a fault diagnosis of low-pressure fuel pressure sensor 53a. It should be noted that the description of steps that are a part of the steps shown in FIG. 6 and are each denoted by the same numeral as the corresponding step in FIG. 5 described above will not be repeated, since the description has already been given above.

In the case where the vehicle speed is less than threshold value V2 (YES in S20) and the battery SOC is higher than threshold value S1 (YES in S21), engine ECU141 makes a determination in S30, based on the travel route information given from the navigation apparatus, as to whether or not vehicle 1 travels on an uphill road before the time taken for the fault diagnosis of low-pressure fuel pressure sensor 53a is elapsed. This determination is made for confirming whether or not there is a possibility that the vehicle enters a road environment where it is difficult to keep engine 10 stopped until the fault diagnosis of low-pressure fuel pressure sensor 53a is completed. It should be noted that the time taken for the fault diagnosis of low-pressure fuel pressure sensor 53a can be determined in advance through an experiment or the like.

In the case where vehicle 1 travels on an uphill road before the time taken for the fault diagnosis of low-pressure fuel pressure sensor 53a is elapsed (YES in S30), the required drive force is larger for vehicle 1 traveling on the uphill road and thus the need to start engine 10 could arise. Thus, engine ECU141 ends the process without performing the fault diagnosis of low-pressure fuel pressure sensor 53a.

In the case where engine ECU 141 determines that vehicle 1 does not travel on an uphill road before the time taken for the fault diagnosis of low-pressure fuel pressure sensor 53a is elapsed (NO in S30), engine ECU141 accordingly determines that engine 10 can be kept stopped longer than the time taken for the fault diagnosis and conducts the fault diagnosis of low-pressure fuel pressure sensor 53a (S13, S14).

As seen from the foregoing, in the case where: the vehicle speed is less than threshold value V2; the battery SOC is larger than threshold value S1; and it is determined that vehicle 1 does not travel on an uphill road based on the travel route information given from the navigation apparatus, engine ECU 141 of the present modification determines that engine 10 can be kept stopped and then conducts the fault diagnosis of low-pressure fuel pressure sensor 53a. Therefore, start of engine 10 while fuel pressure P is increased to diagnosis pressure P2 by the fuel pressure increasing process can more appropriately be suppressed.

Although the present specification has been described and illustrated in detail, it is clearly understood that the same is by way of illustration and example only and is not to be taken by way of limitation, the scope of the present specification being interpreted by the terms of the appended claims.

What is claimed is:

1. A vehicle capable of traveling using motive power of at least one of an engine and a motor generator, the vehicle comprising:
    a fuel pump;
    an injection valve configured to inject fuel supplied from the fuel pump to the engine;
    a fuel pressure sensor configured to detect a supply pressure of the fuel generated by the fuel pump; and
    an electronic control unit configured to perform a fuel pressure increasing process of increasing the supply pressure of the fuel generated by the fuel pump to a second fuel pressure higher than a first fuel pressure, the electronic control unit conducts a fault diagnosis of the fuel pressure sensor by comparing the supply pressure of the fuel detected by the fuel pressure sensor to the second fuel pressure during the fuel pressure increasing process, and the electronic control unit determines a presence of a fault when the supply pressure detected by the fuel pressure sensor does not correspond to the second fuel pressure,
    the electronic control unit being configured to conduct the fuel pressure increasing process and the fault diagnosis of the fuel pressure sensor in a case where
    the engine is being stopped,
    a vehicle speed is higher than a threshold value, the threshold value greater than zero, and
    it is determined that the engine can be kept stopped longer than a time taken for the fault diagnosis of the fuel pressure sensor,
    wherein the electronic control unit is configured to stop the engine during the fault diagnosis of the fuel pressure sensor.

2. The vehicle according to claim 1, further comprising a power storage device storing electric power to be supplied to the motor generator, wherein
    the electronic control unit determines that the engine can be kept stopped longer than the time taken for the fault diagnosis of the fuel pressure sensor in a case where a state of charge of the power storage device is higher than a predetermined amount.

3. The vehicle according to claim 1, further comprising an apparatus configured to retrieve travel route information, wherein
    the electronic control unit determines that the engine can be kept stopped longer than the time taken for the fault diagnosis of the fuel pressure sensor in a case where
    the state of charge of the power storage device is higher than the predetermined amount and
    the travel route information is not information indicating an uphill road.

4. The vehicle according to claim 1, wherein
    the first fuel pressure is a control fuel pressure used when the fault diagnosis of the fuel pressure sensor is not conducted, and
    the second fuel pressure is a diagnosis fuel pressure used when the fault diagnosis of the fuel pressure sensor is conducted.

5. The vehicle according to claim 1, wherein the injection valve is a port injection valve injecting fuel to an intake passage of the engine.

6. The vehicle according to claim 1, wherein the electronic control unit determines a presence or absence of a fault of the fuel pressure sensor during the fault diagnosis of the fuel pressure sensor.

\* \* \* \* \*

UNITED STATES PATENT AND TRADEMARK OFFICE
CERTIFICATE OF CORRECTION

PATENT NO. : 10,364,770 B2
APPLICATION NO. : 15/080854
DATED : July 30, 2019
INVENTOR(S) : Kazuya Miyaji

Page 1 of 1

It is certified that error appears in the above-identified patent and that said Letters Patent is hereby corrected as shown below:

In the Specification

Column 4, Line 20, delete "monographic" and insert --nomographic--, therefor.

Signed and Sealed this
Twenty-fourth Day of September, 2019

Andrei Iancu
*Director of the United States Patent and Trademark Office*